(12) United States Patent
Taycher et al.

(10) Patent No.: US 6,687,402 B1
(45) Date of Patent: Feb. 3, 2004

(54) MACHINE VISION METHODS AND SYSTEMS FOR BOUNDARY FEATURE COMPARISON OF PATTERNS AND IMAGES

(75) Inventors: Leonid Taycher, Newtonville, MA (US); Arman Garakani, Wellesley, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 10/000,761

(22) Filed: Oct. 23, 2001

Related U.S. Application Data (63) Continuation of application No. 09/216,048, filed on Dec. 18, 1998, now abandoned.

(51) Int. Cl.[7] .................................................. G06K 9/48
(52) U.S. Cl. ..................................... 382/199; 235/462.8
(58) Field of Search ................................ 382/199, 200, 382/201, 198, 145, 151, 152, 202, 203, 204, 141, 195, 144, 143, 172, 216, 224, 291, 305, 306, 286, 287; 235/462.01, 462.08, 456

(56) References Cited

U.S. PATENT DOCUMENTS

| | | | |
|---|---|---|---|
| 3,816,722 A | 6/1974 | Sakoe et al. |
| 3,936,800 A | 2/1976 | Ejiri et al. |
| 3,967,100 A | 6/1976 | Shimomura |
| 3,968,475 A | 7/1976 | McMahon |
| 3,978,326 A | 8/1976 | Shimomura |
| 4,011,403 A | 3/1977 | Epstein et al. |
| 4,115,702 A | 9/1978 | Nopper |
| 4,115,762 A | 9/1978 | Akiyama et al. |
| 4,183,013 A | 1/1980 | Agrawala et al. |
| 4,200,861 A | 4/1980 | Hubach et al. |
| 4,254,400 A | 3/1981 | Yoda et al. |
| 4,286,293 A | 8/1981 | Jablonowski |
| 4,300,164 A | 11/1981 | Sacks |
| 4,385,322 A | 5/1983 | Hubach et al. |
| 4,435,837 A | 3/1984 | Abernathy |
| 4,441,124 A | 4/1984 | Heebner et al. |
| 4,441,206 A | 4/1984 | Kuniyoshi et al. |
| 4,519,041 A | 5/1985 | Fant et al. |

(List continued on next page.)

FOREIGN PATENT DOCUMENTS

| | | |
|---|---|---|
| EP | 0 265 302 A1 | 9/1987 |
| EP | 0 341 122 A1 | 4/1989 |
| EP | 0 527 632 A2 | 2/1993 |

(List continued on next page.)

OTHER PUBLICATIONS

Bursky, Dave, "CMOS Four–Chip Set Process Images at 20–MHZ Data Rates," Electronic Design, May 28, 1987, pp. 39–44.

Chapter 3: "Guidelines for Developing MMX Code, " Intel.
Chapter 4: "MMX Code Development Strategy," Intel.
Chapter 5: "MMX Coding Techniques," Intel.

(List continued on next page.)

*Primary Examiner*—Jayanti K. Patel
*Assistant Examiner*—Seyed Azarian
(74) *Attorney, Agent, or Firm*—David J. Powsner (57) ABSTRACT

The invention provides boundary-based machine vision methods and systems for comparing a pattern to an image. These contemplate the steps of finding points on a boundary in the image; identifying one or more boundary features, at least one of which is made up of multiple such points; determining point-by-point relationships, if any, between each point defining the boundary feature in the image and points on a boundary in the pattern; and determining a relationship between the boundary feature in the image and the pattern (e.g., whether the boundary feature in the image matches a corresponding feature in the pattern) as a function of the point-by-point relationships.

32 Claims, 8 Drawing Sheets

U.S. PATENT DOCUMENTS

| | | |
|---|---|---|
| 4,534,813 A | 8/1985 | Williamson et al. |
| 4,541,116 A | 9/1985 | Lougheed |
| 4,545,067 A | 10/1985 | Juvin et al. |
| 4,570,180 A | 2/1986 | Baier et al. |
| 4,577,344 A | 3/1986 | Warren et al. |
| 4,581,762 A | 4/1986 | Lapidus et al. |
| 4,606,065 A | 8/1986 | Beg et al. |
| 4,617,619 A | 10/1986 | Gehly |
| 4,630,306 A | 12/1986 | West et al. |
| 4,631,750 A | 12/1986 | Gabriel et al. |
| 4,641,349 A | 2/1987 | Flom et al. |
| 4,688,088 A | 8/1987 | Hamazaki et al. |
| 4,706,168 A | 11/1987 | Weisner |
| 4,707,647 A | 11/1987 | Coldren et al. |
| 4,728,195 A | 3/1988 | Silver |
| 4,730,260 A | 3/1988 | Mori et al. |
| 4,731,858 A | 3/1988 | Grasmueller et al. |
| 4,736,437 A | 4/1988 | Sacks et al. |
| 4,742,551 A | 5/1988 | Deering |
| 4,752,898 A | 6/1988 | Koenig |
| 4,758,782 A | 7/1988 | Kobayashi |
| 4,764,870 A | 8/1988 | Haskin |
| 4,771,469 A | 9/1988 | Wittenburg |
| 4,776,027 A | 10/1988 | Hisano et al. |
| 4,782,238 A | 11/1988 | Radl et al. |
| 4,783,826 A | 11/1988 | Koso |
| 4,783,828 A | 11/1988 | Sadjadi |
| 4,783,829 A | 11/1988 | Miyakawa et al. |
| 4,809,077 A | 2/1989 | Norita et al. |
| 4,821,333 A | 4/1989 | Gillies |
| 4,831,580 A | 5/1989 | Yamada |
| 4,860,374 A | 8/1989 | Murakami et al. |
| 4,860,375 A | 8/1989 | McCubbrey et al. |
| 4,876,457 A | 10/1989 | Bose |
| 4,876,728 A | 10/1989 | Roth |
| 4,891,767 A | 1/1990 | Rzasa et al. |
| 4,903,218 A | 2/1990 | Longo et al. |
| 4,907,169 A | 3/1990 | Lovoi |
| 4,908,874 A | 3/1990 | Gabriel |
| 4,912,559 A | 3/1990 | Ariyoshi et al. |
| 4,912,659 A | 3/1990 | Liang |
| 4,914,553 A | 4/1990 | Hamada et al. |
| 4,922,543 A | 5/1990 | Ahlbom et al. |
| 4,926,492 A | 5/1990 | Tanaka et al. |
| 4,932,065 A | 6/1990 | Feldgajer |
| 4,953,224 A | 8/1990 | Ichinose et al. |
| 4,955,062 A | 9/1990 | Terui |
| 4,959,898 A | 10/1990 | Landman et al. |
| 4,962,423 A | 10/1990 | Yamada et al. |
| 4,972,359 A | 11/1990 | Silver et al. |
| 4,982,438 A | 1/1991 | Usami et al. |
| 5,005,126 A | 4/1991 | Haskin |
| 5,012,402 A | 4/1991 | Akiyama |
| 5,012,433 A | 4/1991 | Callahan et al. |
| 5,012,524 A | 4/1991 | LeBeau |
| 5,027,419 A | 6/1991 | Davis |
| 5,046,190 A | 9/1991 | Daniel et al. |
| 5,054,096 A | 10/1991 | Beizer |
| 5,060,276 A | 10/1991 | Morris et al. |
| 5,063,608 A | 11/1991 | Siegel |
| 5,073,958 A | 12/1991 | Imme |
| 5,081,656 A | 1/1992 | Baker et al. |
| 5,081,689 A | 1/1992 | Meyer et al. |
| 5,083,073 A | 1/1992 | Kato |
| 5,086,478 A | 2/1992 | Kelly-Mahaffey et al. |
| 5,090,576 A | 2/1992 | Menten |
| 5,091,861 A | 2/1992 | Geller et al. |
| 5,091,968 A | 2/1992 | Higgins et al. |
| 5,093,867 A | 3/1992 | Hori et al. |
| 5,113,565 A | 5/1992 | Cipolla et al. |
| 5,115,309 A | 5/1992 | Hang |
| 5,119,435 A | 6/1992 | Berkin |
| 5,124,622 A | 6/1992 | Kawamura et al. |
| 5,133,022 A | 7/1992 | Weideman |
| 5,134,575 A | 7/1992 | Takagi |
| 5,143,436 A | 9/1992 | Baylor et al. |
| 5,145,432 A | 9/1992 | Midland et al. |
| 5,151,951 A | 9/1992 | Ueda et al. |
| 5,153,925 A | 10/1992 | Tanioka et al. |
| 5,155,775 A | 10/1992 | Brown |
| 5,159,281 A | 10/1992 | Hedstrom et al. |
| 5,159,645 A | 10/1992 | Kumagai |
| 5,164,994 A | 11/1992 | Bushroe |
| 5,168,269 A | 12/1992 | Harlan |
| 5,175,808 A | 12/1992 | Sayre |
| 5,179,419 A | 1/1993 | Palmquist et al. |
| 5,185,810 A | 2/1993 | Freischlad |
| 5,185,855 A | 2/1993 | Kato et al. |
| 5,189,712 A | 2/1993 | Kajiwara et al. |
| 5,204,944 A | 4/1993 | Wolberg et al. |
| 5,206,820 A | 4/1993 | Ammann et al. |
| 5,216,503 A | 6/1993 | Paik et al. |
| 5,225,940 A | 7/1993 | Ishii et al. |
| 5,230,027 A | 7/1993 | Kikuchi |
| 5,243,607 A | 9/1993 | Masson et al. |
| 5,253,306 A | 10/1993 | Nishio |
| 5,253,308 A | 10/1993 | Johnson |
| 5,259,038 A * | 11/1993 | Sakou et al. ............... 382/199 |
| 5,265,173 A | 11/1993 | Griffin et al. |
| 5,271,068 A | 12/1993 | Ueda et al. |
| 5,287,449 A | 2/1994 | Kojima |
| 5,297,238 A | 3/1994 | Wang et al. |
| 5,297,256 A | 3/1994 | Wolstenholme et al. |
| 5,299,269 A | 3/1994 | Gaborski et al. |
| 5,307,419 A | 4/1994 | Tsujino et al. |
| 5,311,598 A | 5/1994 | Bose et al. |
| 5,315,388 A | 5/1994 | Shen et al. |
| 5,319,457 A | 6/1994 | Nakahashi et al. |
| 5,327,156 A | 7/1994 | Masukane et al. |
| 5,329,469 A | 7/1994 | Watanabe |
| 5,337,262 A | 8/1994 | Luthi et al. |
| 5,337,267 A | 8/1994 | Colavin |
| 5,363,507 A | 11/1994 | Nakayama et al. |
| 5,367,439 A | 11/1994 | Mayer et al. |
| 5,367,667 A | 11/1994 | Wahlquist et al. |
| 5,371,690 A | 12/1994 | Engel et al. |
| 5,371,836 A | 12/1994 | Mitomi et al. |
| 5,388,197 A | 2/1995 | Rayner |
| 5,388,252 A | 2/1995 | Dreste et al. |
| 5,398,292 A | 3/1995 | Aoyama |
| 5,432,525 A | 7/1995 | Maruo et al. |
| 5,440,699 A | 8/1995 | Farrand et al. |
| 5,455,870 A | 10/1995 | Sepai et al. |
| 5,455,933 A | 10/1995 | Schieve et al. |
| 5,471,312 A | 11/1995 | Watanabe et al. |
| 5,475,766 A | 12/1995 | Tsuchiya et al. |
| 5,475,803 A | 12/1995 | Stearns et al. |
| 5,477,138 A | 12/1995 | Efjavic et al. |
| 5,481,712 A | 1/1996 | Silver et al. |
| 5,485,570 A | 1/1996 | Bushboom et al. |
| 5,491,780 A | 2/1996 | Fyles et al. |
| 5,495,424 A | 2/1996 | Tokura |
| 5,495,537 A | 2/1996 | Bedrosian et al. |
| 5,496,106 A | 3/1996 | Anderson |
| 5,500,906 A | 3/1996 | Picard et al. |
| 5,506,617 A | 4/1996 | Parulski et al. |
| 5,506,682 A | 4/1996 | Pryor |
| 5,511,015 A | 4/1996 | Flockencier |
| 5,519,840 A | 5/1996 | Matias et al. |
| 5,526,050 A | 6/1996 | King et al. |
| 5,528,703 A | 6/1996 | Lee |

| | | |
|---|---|---|
| 5,532,739 A | 7/1996 | Garakani et al. |
| 5,539,409 A | 7/1996 | Mathews et al. |
| 5,544,256 A | 8/1996 | Brecher et al. |
| 5,548,326 A | 8/1996 | Michael |
| 5,550,763 A | 8/1996 | Michael |
| 5,550,888 A | 8/1996 | Neitzel et al. |
| 5,553,859 A | 9/1996 | Kelly et al. |
| 5,557,410 A | 9/1996 | Huber et al. |
| 5,557,690 A | 9/1996 | O'Gorman et al. |
| 5,566,877 A | 10/1996 | McCormack |
| 5,568,563 A | 10/1996 | Tanaka et al. |
| 5,574,668 A | 11/1996 | Beaty |
| 5,574,801 A | 11/1996 | Collet-Beillon |
| 5,581,632 A | 12/1996 | Koljonen et al. |
| 5,583,949 A | 12/1996 | Smith et al. |
| 5,583,954 A | 12/1996 | Garakani |
| 5,586,058 A | 12/1996 | Aloni et al. |
| 5,592,562 A | 1/1997 | Rooks |
| 5,594,859 A | 1/1997 | Palmer et al. |
| 5,602,937 A | 2/1997 | Bedrosian et al. |
| 5,608,490 A | 3/1997 | Ogawa |
| 5,608,872 A | 3/1997 | Schwartz et al. |
| 5,640,199 A | 6/1997 | Garakani et al. |
| 5,640,200 A | 6/1997 | Michael |
| 5,642,158 A | 6/1997 | Petry, III et al. |
| 5,647,009 A | 7/1997 | Aoki et al. |
| 5,649,032 A | 7/1997 | Burt et al. |
| 5,657,403 A | 8/1997 | Wolff et al. |
| 5,673,334 A | 9/1997 | Nichani et al. |
| 5,675,358 A | 10/1997 | Bullock et al. |
| 5,676,302 A | 10/1997 | Petry, III |
| 5,684,530 A | 11/1997 | White |
| 5,696,848 A | 12/1997 | Patti et al. |
| 5,715,369 A | 2/1998 | Spoltman et al. |
| 5,715,385 A | 2/1998 | Stearns et al. |
| 5,717,785 A | 2/1998 | Silver |
| 5,724,439 A | 3/1998 | Mizuoka et al. |
| 5,734,807 A | 3/1998 | Sumi |
| 5,739,846 A | 4/1998 | Gieskes |
| 5,740,285 A | 4/1998 | Bloomberg et al. |
| 5,742,037 A | 4/1998 | Scola et al. |
| 5,751,853 A | 5/1998 | Michael |
| 5,754,679 A | 5/1998 | Koljonen et al. |
| 5,757,956 A | 5/1998 | Koljonen et al. |
| 5,761,326 A | 6/1998 | Brady et al. |
| 5,761,337 A | 6/1998 | Nishimura et al. |
| 5,768,443 A | 6/1998 | Michael et al. |
| 5,793,899 A | 8/1998 | Wolff et al. |
| 5,796,386 A | 8/1998 | Lipscomb et al. |
| 5,796,868 A * | 8/1998 | Dutta-Choudhuty ........ 382/199 |
| 5,801,966 A | 9/1998 | Ohashi |
| 5,805,722 A | 9/1998 | Cullen et al. |
| 5,809,658 A | 9/1998 | Jackson et al. |
| 5,818,443 A | 10/1998 | Schott |
| 5,822,055 A | 10/1998 | Tsai et al. |
| 5,825,483 A | 10/1998 | Michael et al. |
| 5,825,913 A | 10/1998 | Rostami et al. |
| 5,835,099 A | 11/1998 | Marimont |
| 5,835,622 A | 11/1998 | Koljonen et al. |
| 5,845,007 A | 12/1998 | Ohashi et al. |
| 5,847,714 A | 12/1998 | Naqvi et al. |
| 5,848,189 A | 12/1998 | Pearson et al. |
| 5,850,466 A | 12/1998 | Schott |
| 5,859,923 A | 1/1999 | Petry, III et al. |
| 5,861,909 A | 1/1999 | Garakani et al. |
| 5,870,495 A * | 2/1999 | Mancuso et al. ........... 382/199 |
| 5,872,870 A | 2/1999 | Michael |
| 5,878,152 A | 3/1999 | Sussman |
| 5,900,975 A | 5/1999 | Sussman |
| 5,901,241 A | 5/1999 | Koljonen et al. |
| 5,909,504 A | 6/1999 | Whitman |
| 5,912,768 A | 6/1999 | Sissom et al. |
| 5,912,984 A | 6/1999 | Michael et al. |
| 5,918,196 A | 6/1999 | Jacobson |
| 5,933,523 A | 8/1999 | Drisko et al. |
| 5,943,441 A | 8/1999 | Michael |
| 5,949,901 A | 9/1999 | Nichani et al. |
| 5,974,169 A * | 10/1999 | Bachelder ................... 382/151 |
| 5,974,365 A | 10/1999 | Mitchell |
| 6,002,738 A | 12/1999 | Cabral et al. |
| 6,016,152 A | 1/2000 | Dickie |
| 6,069,668 A | 5/2000 | Woodham, Jr. et al. |
| 6,118,540 A | 9/2000 | Roy et al. |
| 6,141,040 A | 10/2000 | Toh |
| 6,188,784 B1 | 2/2001 | Linker, Jr. |
| 6,259,827 B1 | 7/2001 | Nichani |
| 6,298,149 B1 | 10/2001 | Nichani et al. |

FOREIGN PATENT DOCUMENTS

| | | |
|---|---|---|
| EP | 0 777 381 A2 | 11/1996 |
| FR | 2 598 019 | 4/1986 |
| WO | WO 95/21376 | 8/1995 |
| WO | WO 95/22137 | 8/1995 |
| WO | WO 97/21189 | 6/1997 |
| WO | WO 97/22858 | 6/1997 |
| WO | WO 97/24692 | 7/1997 |
| WO | WO 97/24693 | 7/1997 |
| WO | WO 98/30890 | 7/1998 |
| WO | WO 98/52349 | 11/1998 |
| WO | WO 98/59490 | 12/1998 |
| WO | WO 99/15864 | 4/1999 |

OTHER PUBLICATIONS

Chapter 3: "Optimization Techniques for Integer Blended Code," Intel.

"Geometrical Image Modification," pp. 421–442.

Gevorkian David Z., Astola Jaakko T., and Atourian Samvel M. "Improving Gil–Werman Algorithm for Running Min and Max Filters" IEEE Transactions on Pattern Analysis and Machine Intelligence, vol. 19, No. 5, May 1997, pp. 526–529.

Gil, Joseph and Werman Michael. "Computing 2–D Min, Median, and Max Filters" IEEE Transactions on Pattern Analysis and Machine Intelligence, vol. 15, No. 5, May 1993, pp. 504–507.

Grimson, W. Eric L. and Huttenlocher, Daniel P., "On the Sensitivity of the Hough Transform for Object Recognition", May 1990, IEEE Transactions on Pattern Analysis and Machine Intelligence, Vol 12, No. 3.

Horn, Berthold Klaus Paul. "Robot Vision", The Massachusetts Institute for Technology, 1986.

Medina–Mora et al. (1981) An Incremental Programming Environment, IEEE Transactions on Software Eng. SE–7:472–482.

NEC Electronics Inc., PD7281 Image Pipelined Processor, Product Information Brochure, pp. 2–169–2–211.

Newsletter from Acquity Imaging, Inc., "Remote Vision Support Package—The Phones Are Ringing!," 1 page.

PictureTel Corporation Product Brochure "Picturetel Live PCS 100(tm) Personal Visual Communications System," 3 pp. (1993).

PictureTel Corporation Product Brochure "Picturetel System 1000: Complete Videoconferencing for Cost Sensitive Applications," 4 pp. (1993).

PictureTel Corporation Product Brochure, "Picturetel System 4000(tm) A Family of Models to Fit Your Application from Offices to Boardrooms, Classrooms, and Auditoriums," 4 pp. (1993).

Plessey Semiconductors, Preliminary Information, May 1986, Publication No. PS2067, May 1986, pp. 1–5.

Pratt, William K. Digital Image Processing (2nd Ed.), 1991, pp. 421–445.

Racca Roberto G., Stephenson Owen, and Clements Reginald M. High–speed video analysis system using multiple shuttered charge–coupled device imagers and digital storage. Optical Engineering (Jun. 1992) 31;6.

Ray, R. "Automated inspection of solder bumps using visual signatures of specular image–highlights," Computer Vision and Pattern Recognition, 1989. Proceedings CVPR '89. Pp. 588–596.

Rosenfeld, Azriel, "Computer Vision: Basic Principles," Proceedings of the IEEE. vol.76, No. 8, Aug. 1988. pp. 863–868.

Symantec Corporation, "The Norton pcAnywhere User's Guide," Table of Contents 8 pp; Introduction of pcAnywhere Technology pp i–vii; Chapter 7—Sessions; pp. 191–240 (1991).

Teitelbaum et al. (19810 The Cornell Program Synthesizer: A Syntax–Directed Programming Environment, Communications of the ACM 24:563–573.

Tsai, Roger Y. "A Versatile Camera Calibration Technique for High–Accuracy 3D Mahcine Vision Metrology Using Off–the–Shelf TV Cameras and Lenses," The Journal of Robotics and Automation, Vol Ra–3, No. 4, Aug. 1987, pp. 323–344.

Tsai, Roger Y. "An Efficient and Accurate Camera Calibration Technique for 3D Machine Vision," Proceedings IEEE Conference on Computer Vision and Pattern Recognition Jun. 22–26, 1986, pp. 364–374.

Turney, Jerry L. "Recognizing Partially Occluded Parts," IEEE Transactions on Pattern Analysis and Machine Intelligence, PAMI–7 (1985) Jul., No. 4, pp. 410–421.

Unser, Michael. "Convolution–Based Interpolation for Fast, High–Quality Rotation of Images," IEEE Transactions on Image Processing vol. 4 No. 10 (Oct. 1995) pp. 1371–1381.

Viitanen, Jouko, et al. "Hierarchical pattern matching with an efficient method for estimating rotations," Proceedings IECON '87 International Conference on Industrial Electronics, Control, and Instrumentation, Nov. 3–6, 1987, 6 pp.

Wu, Yifeng and Maitre, Henri. "Registration of a SPOT Image and a SAR Image Using Multiresolution Representation of a Coastline," 10th International Conference on Pattern Recognition Jun. 16–21, 1990, pp. 913–917.

* cited by examiner

| Point # | Pattern Feature | Image Feature | Pattern Location | Image Location | Δ Dist. | Pattern direction | Image direction | Δ direction | Pattern contrast | Image contrast | Δ contrast | Score |
|---|---|---|---|---|---|---|---|---|---|---|---|---|
| 1 | 1 | 12 | (0.5,0.3) | (0.4,0.3) | 0.1 | 30° | 29° | 1° | 110 | 108 | 2 | .8 |
| 2 | 1 | 12 | (1.1,0.8) | (1.1,0.8) | 0.0 | 31° | 31° | 0° | 98 | 90 | 8 | .95 |
| 3 | 1 | 15 | (1.9,3.2) | (1.9,3.7) | 0.5 | 28° | 30° | 2° | 99 | 99 | 0 | .7 |
| ... | ... | ... | ... | ... | ... | ... | ... | ... | ... | ... | ... | ... |

MACHINE VISION METHODS AND SYSTEMS FOR BOUNDARY FEATURE COMPARISON OF PATTERNS AND IMAGES

REFERENCE TO RELATED APPLICATIONS

This application is a continuation of U.S. patent application Ser. No. 09/216,048, filed Dec. 18, 1998, now abandoned entitled "MACHINE VISION METHODS AND SYSTEMS FOR BOUNDARY FEATURE COMPARISON OF PATTERNS AND IMAGES", the teachings of which are incorporated herein by reference.

This application is related to commonly assigned U.S. patent application Ser. No. 09/215,943, filed Dec. 18, 1998, entitled IMPROVED MACHINE VISION METHODS AND SYSTEMS FOR BOUNDARY POINT-BASED COMPARISON OF PATTERNS AND IMAGES, the teachings of which are incorporated herein by reference.

BACKGROUND OF THE INVENTION

The invention pertains to machine vision and, more particularly, to methods and apparatus for comparing patterns and images. The invention has application, for example, in quality control and in the automated inspection of parts under assembly.

Machine vision refers to the automated analysis of images to determine characteristics of objects shown in them. It is often employed in automated manufacturing lines, where images of components are analyzed to determine placement and alignment prior to assembly. Machine vision is also used for quality assurance. For example, in the semiconductor device industry, images of chips are analyzed to insure that leads, solder paste and other components do not overrun designated boundaries.

Central to many machine vision applications is the comparison of patterns and images. To "read" a product label, for example, a machine vision system must compare each symbol in an image of the label against patterns representing all possible letters and numbers. Likewise, to determine whether a particular part is present on a conveyor belt, a machine vision system must compare each object from an image of that belt against a pattern representing the sought-after part.

A common machine vision technique for comparing a pattern and an image is golden template comparison, or GTC. This involves aligning the pattern—here, referred to as a "template"—with the image and subtracting the two. The result can be used to determine if an object represented by the template is present in the image at the alignment location. For example, in semiconductor die inspection, GTC can be used to subtract a template representing a model die from a runtime image of a die under assembly. If the latter is properly formed, the resultant image or pixel array is blank (e.g., all black or white). On the other hand, if there are defects in the die under assembly, e.g., adhesive blotches, these will appear as patterns in the resultant image or array.

As parts under inspection become smaller, manufacturing tolerances more exacting, and manufacturing lines faster, GTC and other comparison techniques are continually pressed to provide results to sub-pixel levels of accuracy. This is problematic at the boundaries of the objects being inspected, since the image data along edges is often unreliable. Though GTC remains a mainstay of machine vision, there is a need for still better image comparison tools. An object of this invention is to provide such tools.

A more particular object of this invention is to provide improved methods and systems for comparing a pattern to an image. A still more particular object of the invention is to provide such methods and systems that are accurate along boundaries of objects contained in the pattern or image.

Another object of the invention is to provide such methods and systems as facilitate quantitative and qualitative analysis of the similarities and differences between a compared pattern and image.

Still yet another object of the invention is to provide such methods and systems as are amenable to use withing existing machine vision apparatus and which operate without undue consumption of resources.

SUMMARY OF THE INVENTION

The foregoing are among the objects attained by the invention, which provides boundary-based machine vision methods and systems for comparing a pattern to an image. Such a method, according to one aspect of the invention, includes the steps finding points on a boundary in the image and identifying one or more boundary features, at least one of which is made up of multiple such points. The method further includes determining point-by-point relationships, if any, between each point defining the boundary feature in the image and points on a boundary in the pattern. A relationship between the boundary feature in the image and the pattern (e.g., whether the boundary feature in the image matches a corresponding feature in the pattern) is then determined as a function of the point-by-point relationships.

According to further aspects of the invention, the point-by-point relationships are identified as "matches," i.e., boundary points in the image that match boundary points in the pattern, "extras," i.e., boundary points in the image which do not match boundary points in the pattern, and "missing," i.e., boundary points in the pattern that do not match boundary points in the image.

In related aspects, the invention provides methods as described above in which boundary points in the image and pattern are deemed to "correspond" to one another if they reside at substantially the same locations, e.g., if the distance between their respective coordinate locations is within a selected range. Such points are deemed to "match" if, in addition, they lie at substantially the same angles with respect to their respective neighbors (e.g., the difference between their respective angles is within a selected range) and if they are of substantially the same contrasts (e.g., the difference between their respective contrasts is within a selected range).

In another aspect, the invention provides methods as described above including generating quantitative and/or qualitative information about matching, extra or missing points. This includes the determining the distance between each boundary point in the image and the corresponding boundary point in the pattern. It can also include determining the differences between the directions of those points and/or the differences in their contrasts.

According to still further aspects of the invention, image boundary features are determined to be "matching" if, for example, the majority of points making up the feature match boundary points in the pattern. Alternatively, or in addition, a boundary feature in the image can be marked as matching if an average, or other statistical measure, of location, angle and/or contrast differences between the points making up that feature and the corresponding points in the pattern fall within selected ranges.

According to related aspects of the invention, an image boundary feature can be marked or identified as "extra" if the majority of its boundary points do not match points in the pattern and/or if an average (or other statistical measure) of location, angle and/or contrast differences between the points making up that feature and corresponding points in the pattern fall outside a selected range. A feature can be likewise be identified as "missing" if the majority of points that define it in the pattern do not match points in the image boundary and/or if an average (or other statistical measure) of differences between the points making up that feature in the pattern and corresponding points in the image fall outside a selected range.

In another aspect, the invention provides a method as described above including generating quantitative and/or qualitative information about the matching, extra or missing features. This can also include counting the number of matching points that make up each feature and/or, by way of further example, determining the minimum and maximum distances between the points that make up that feature and the corresponding points that make up the corresponding feature in the pattern. Quantitative information can also include, in the case of features identified as extra, their lengths, and/or their degree of linearity. In addition to, or in lieu of, such quantitative information, the information can include a qualitative characterization of the similarity of each matching point or feature (e.g., "good," "bad," etc.)

Still further aspects of the invention provide machine vision systems operating in accord with the methods described above.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
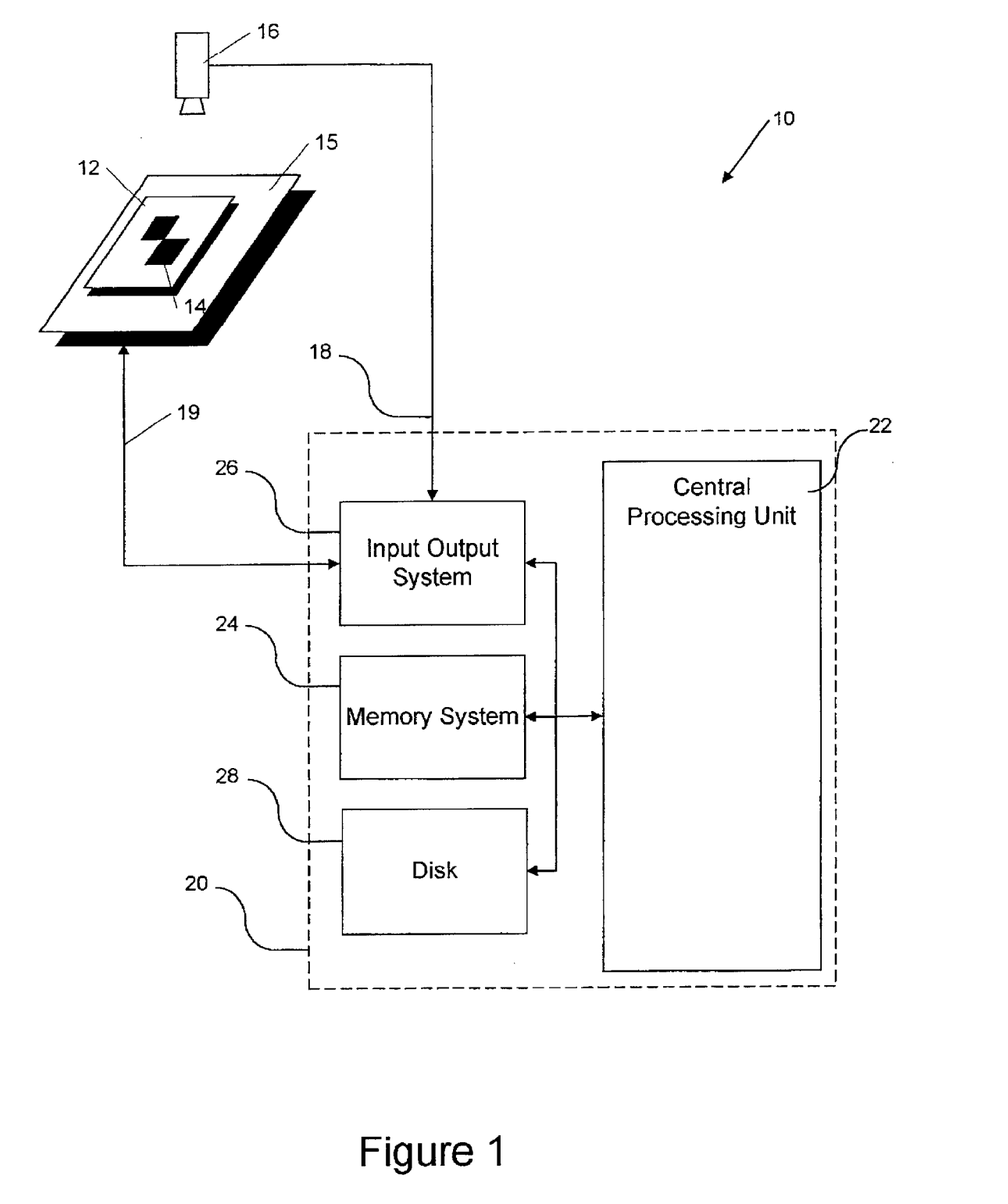
FIG. 1 depicts an image analysis system of the type used to practice the invention.

FIG. 1 depicts an image analysis system 10 according to the invention for boundary-based comparison on images. The system 10 includes an image capture device, e.g., camera 16, that generates an image of a scene including object 12. Digital image data (or pixels) generated by the capturing device 16 represents, in the conventional manner, the image contrast of each point in the field of view of the capturing device. The image acquisition device may be video camera, charge coupled display (CCD) device, or any other device suitable for imaging device object 12. In the illustration, the object 12 is disposed on a platform 15 capable of translating and rotating the object, e.g., based on information determined by image analysis system 10 in connection with the mechanisms and techniques described herein.

Digital image data is transmitted from capturing device 16 via a communications path 18 to the image analysis system 20. This can be a conventional digital data processor, or a vision processing system of the type commercially available from the assignee hereof, Cognex Corporation, as programmed in accord with the teachings hereof for boundary-based comparison of images, e.g., acquired by device 16. The image analysis system 20 may have one or more central processing units 22, main memory 24, input-output system 26, and disk drive (or other mass storage device) 28, all of the conventional type.

The system 10 and, more particularly, central processing unit 22, is configured by programming instructions according to teachings hereof for operation as further described and illustrated herein. Those skilled in the art will appreciate that, in addition to implementation on a programmable digital data processor, the methods taught herein can be implemented in special purpose hardware.

Figure 2A:
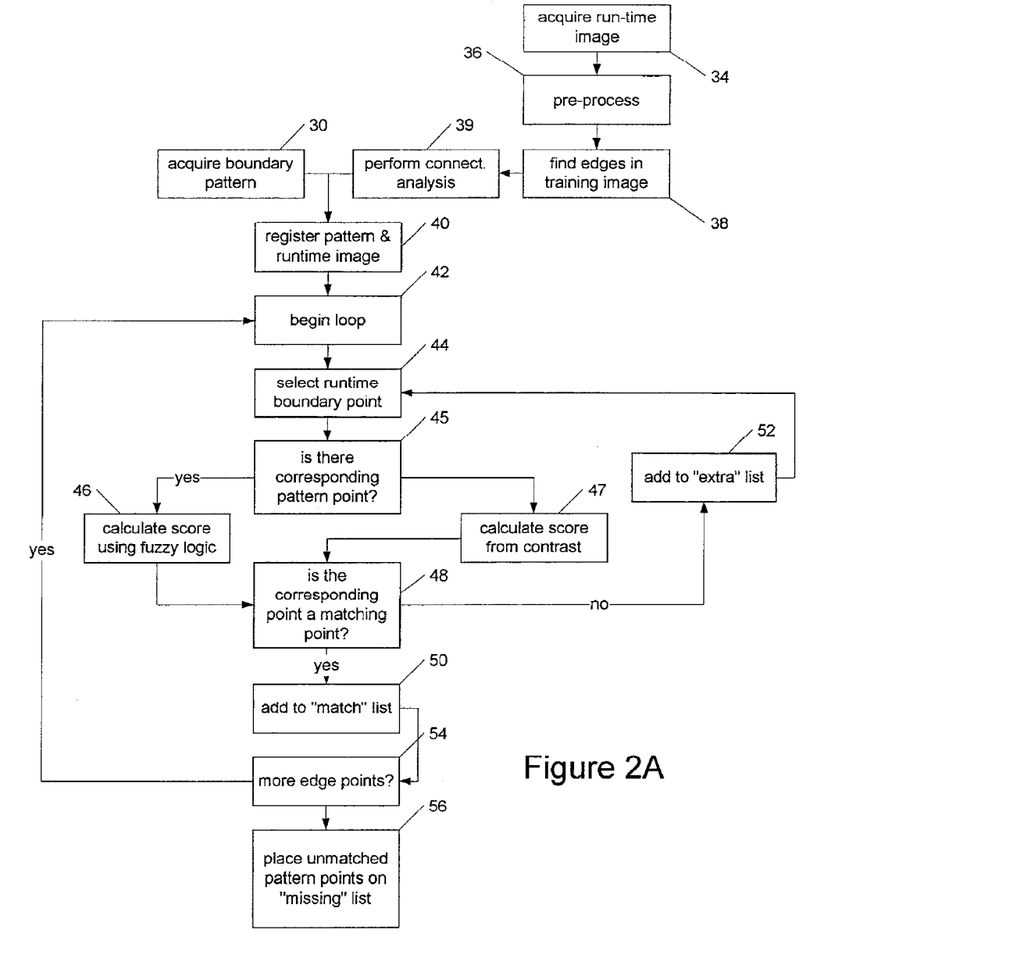
FIGS. 2A–2D depict a method according to the invention for boundary-based comparison of points and features in a template and image.

FIG. 2A depicts a method for point-by-point boundary-based comparison of a pattern and an image comparison according to the invention.

In step 30, a pattern or template for use in the comparison is acquired. The pattern preferably represents boundaries of objects of interest, i.e., boundary points that are expected to be found in a runtime image. These can be generated from one or more images, e.g., training images, or geometric data in any conventional way known in the art. A preferred technique for identifying a boundary in a training image is described in co-pending, commonly assigned U.S. patent application Ser. No. 08/979,588, filed NOV. 26, 1997. Other techniques for identifying boundaries in the training image include Canny, Sobel.

Where the boundary pattern is generated from an actual image, a preferred practice includes subjecting that pattern to connectivity analysis, e.g., using any conventional tool known for such purpose in the art. This results in identification of features on the boundary, defined by sequences of adjacent (or substantially adjacent) boundary points. It also facilitates comparison of the pattern with the runtime image both on feature-by-feature bases, as described below.

During the course of a preferred connectivity analysis, points that nearby to one another, but not quite adjacent, are treated as if they were adjacent. Thus, for example, whereas conventional connectivity analysis might normally treat as adjacent (and, therefore, part of the same curve or boundary) only points that lie on adjacent vertices of an imaginary 1×1 pixel grid, step 32 preferably treats also treats as adjacent points that lie on adjacent vertices of a 2×2, 3×3 or larger grids.

Connectivity analysis can be performed in instances where boundary patterns are generated from geometric data, as well. Often, however, such analysis is not required in order to identify discrete features on the boundaries. A preferred practice, nonetheless, calls for generating, along with such a boundary image, feature-identifying information of the type that typically results from connectivity analysis.

Figure 4A:
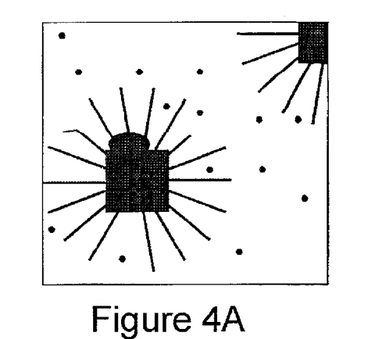
FIGS. 4A–4C depicts a runtime image, a preprocessed runtime image, and boundaries thereof, respectively, as generated during practice of the invention.

In step 34 an image against which the pattern is to be compared is acquired. This is referred to as a "runtime" image. Though this image, too, can be generated from geometrical data or otherwise, it typically represents an image of a part under inspection, e.g., a part on an assembly line. FIG. 4A depicts such a runtime image of a semiconductor device under assembly.

Figure 4B:
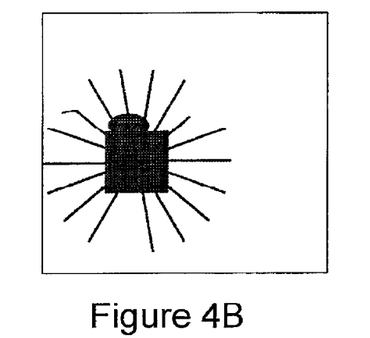

In step 36, the runtime image is preprocessed, e.g., to eliminate artifacts and extraneous imagery. This is illustrated in FIG. 4B, which illustrates the effects of removing images of extraneous parts and the removal of artifacts, such as noise. Additional preprocessing steps can also be applied including, without limitation, contrast enhancement and windowing.

Figure 4C:
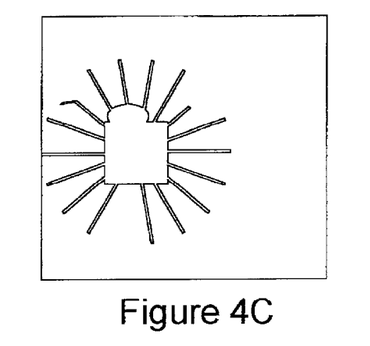

In step 38, boundaries in the preprocessed runtime image are identified. This can be done in any known manner, as discussed above. FIG. 4C depicts a boundary image generated from the image of FIG. 4B.

The boundary image resulting from operation of step 38, e.g., FIG. 4C, is preferably subjected to connectivity analysis in order to identify its features, i.e., sequences of adjacent or substantially adjacent points; see step 39. As above, this preferably includes treating as adjacent points that nearby to one another, but not quite adjacent.

Though step 30 can be executed substantially concurrently with steps 34–39, in a preferred embodiment step 30 is performed earlier, i.e., during a training phase.

In step 40, the boundary pattern and runtime image boundary are registered and, then, placed in a common orientation, or canonical pose. This can be accomplished using any conventional technique known in the art.

Step 42 defines the beginning of a loop that is intended to identify (i) boundary points from the runtime image that correspond with and match points in the boundary pattern, i.e., "matches" and (ii) boundary points from the runtime image that do not correspond with points in the boundary pattern in the runtime image, i.e., "extras."

In step 44, a boundary point from the runtime image is selected for comparison with points in the pattern. This can be any boundary point in the image, though, preferably the points are selected in feature-by-feature and point-by-point succession.

In step 45, the method determines whether there is a boundary point in the pattern that corresponds with the selected boundary point from the image. Boundary points from the image and pattern are deemed to correspond with one another if those points lie within a designated distance of one another in the pattern and image, after they have been registered and transformed to the canonical pose. Depending upon the geometry of the image acquisition set-up that distance can be as great as ten pixels (or more) or as little as one pixel (or less).

If there is a boundary point in the pattern that corresponds with the selected boundary point from the image, in step 48, the method determines whether those points match, i.e., if they lie at substantially the same angles (or, put another way, if the difference between their respective angles is within a selected range) and if they are of substantially the same contrasts (or, put another way, if the difference between their respective contrasts is within a selected range).

As with location, the angle and contrast of the boundary points in the pattern and image can be determined in any manner conventional in the art. As used herein the "angle" of a boundary point refers to the angle between it and one or more of its neighboring points.

In one embodiment of the invention, determinations as to the differences in angle and contrast are made in ways analogous to determination as to differences in location.

That is, the method can compare the angle and contrast of the runtime image boundary point with that of the corresponding boundary pattern point, deeming the two points as matching if the difference in their angles is as great as 10 degrees (or more) or as little as 5 degrees (or less), and the difference in their contrasts is as great as 20 percent (or more) or as little as 10 percent (or less).

If step 48 results in a determination that the corresponding points do match, step 50 calls for recording them in a "match" array, along with their respective locations, angles and contrasts, and along with the computed differences between those respective values. In a preferred embodiment, a score of the type described below is stored with each pair of points in the match array. In addition, the method can also store with each pair of points other quantitative or qualitative measures, such as the score described below or the characterizations "good," "acceptable," etc. As used herein, the term "array" refers to any data structure known in the art suitable for storing the cited information.

If step 48 results in a negative determination, the selected runtime image boundary point is recorded in an "extra" array. See step 52. According to some practices of the invention, the information regarding boundary pattern point most nearly corresponding or matching the selected image boundary point can be recorded as well, e.g., in a manner similar to the recording of information for matching points discussed above in connection with step 50. In a preferred embodiment, a score of the type described below is stored with each point in the extra array.

In a preferred embodiment, step 46 utilizes a combination of "fussy" logic and thresholds to determine whether corresponding points match. More particularly, it assigns a score between –1 and 1, inclusive, to each pair of points based on the differences in the distances, angles and contrasts—where a score of –1 indicates that the points are, in all probability, not a match, and a score of +1 indicates that they are, in all probability, indeed a match.

Preferred in logic for assigning such a score tests each of the distance, angle and contrast differences. The fuzzy less-than operator is used. With this operator, if the value tested is less than a low threshold, a sore of one is assigned; however, if the value tested is greater than a high threshold, than a score of zero is assigned. If the value tested is between the low and high thresholds, than a linear mapping is applied to assign a score between zero and one.

In the illustrated embodiment, such a fizzy less-than operator is used to generate scores for each of the differences in distance, angle and contrast, with different respective thresholds being used for each such type of difference. An overall score is generated from the three resulting scores taking the geometric mean of those scores, doubling it, and subtracting one, thereby, producing an overall score between –1 and 1.

The aforementioned fuzzy logic is preferably used to assign scores to each pair of points in the match array, as well as to each point that is placed in extras and don't know arrays. Where no corresponding boundary pattern point exists, control transfer to step 47. There, the score assigned is, simply, the negative value of the contrast of the image boundary point.

Once a score has been determined for a pair of corresponding points, the method of step 48 makes a determination as to whether they match based on thresholds. In one embodiment, for example, all pairs with a score greater than 0.30 can be deemed matches, while those with lesser scores are deemed extras.

In a preferred embodiment, two thresholds are used, $T_L$ and $T_H$. Pairs with a score above $T_H$ are deemed matches and are placed in the match array. Those with scores below $T_L$ are deemed "extras" and are placed in the extras array. Pairs with scores between $T_L$ and $T_H$ are placed a "don't know" array. The thresholds can be set at any values appropriate to a given image application, e.g., $T_L$=–0.3 and $T_H$=+0.3. In a preferred embodiment, those thresholds are set by the operator.

In step 54, control is transferred back to step 42, if there are any more runtime image boundary points to match. Otherwise, control passes to step 56, where the illustrated method determines whether there are any unmatched boundary points from the boundary pattern—i.e., any boundary points from that pattern which were not found to match boundary points from the runtime image.

In step 56, any such unmatched boundary pattern points are recorded in a "missing" array. Preferably, scores assigned to each such point in accord with the aforementioned fuzzy logic are stored to the array, as well. Similar to the discussion above, where no corresponding runtime image boundary point exists for a given boundary pattern point, the negative value of the contrast is used as the score.

Figure 3A:
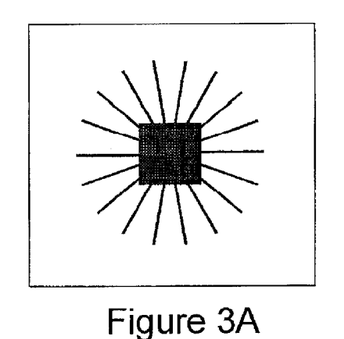
FIGS. 3A–3B depict a training image and a template generated therefrom.
Figure 3B:
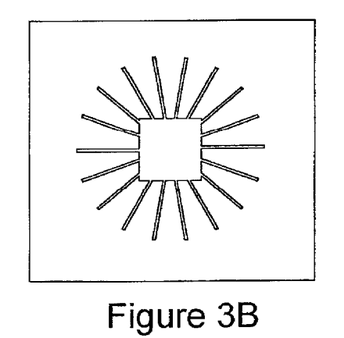
Figure 5A:
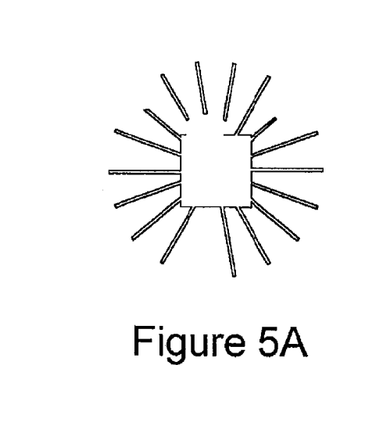
FIGS. 5A–5B are graphical and tabular depictions of a "match" array of the type generated during comparison of the template of FIG. 3B and image of FIG. 4C by systems and methods according to the invention.
Figure 5B:
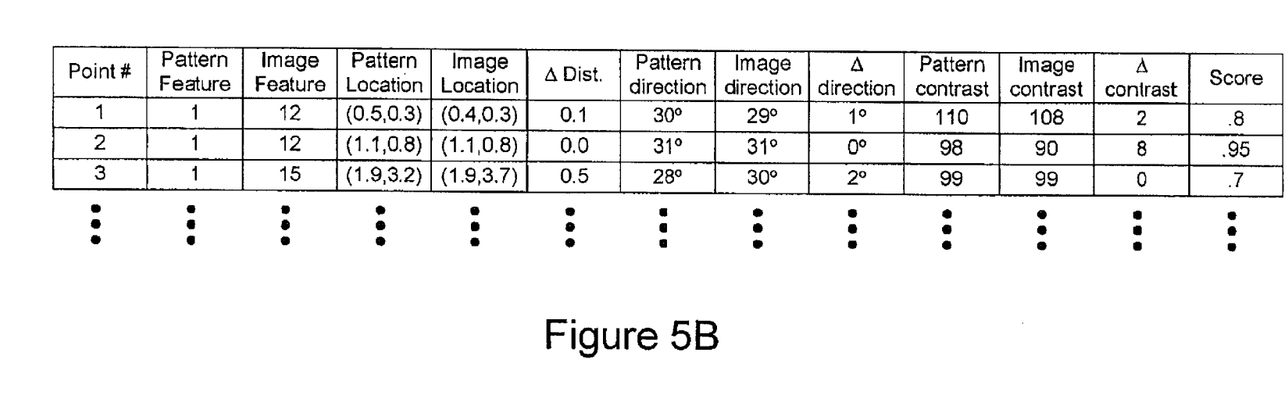
Figure 6:
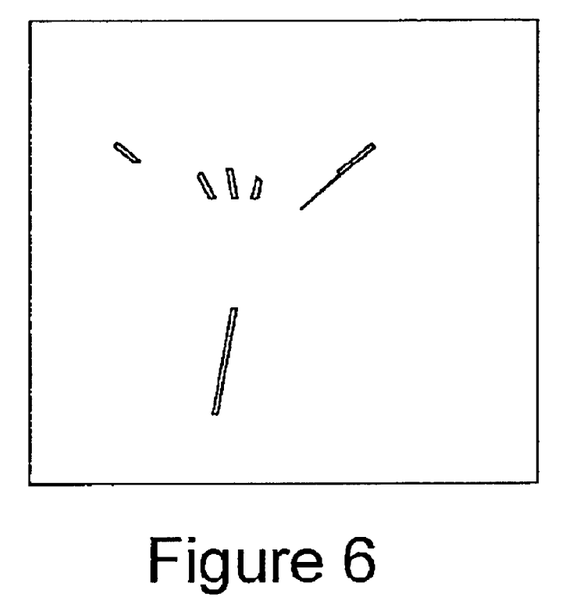
FIG. 6 is a graphical depiction of a "missing" array of the type generated during comparison of the template of FIG. 3B and image of FIG. 4C by systems and methods according to the invention.
Figure 7:
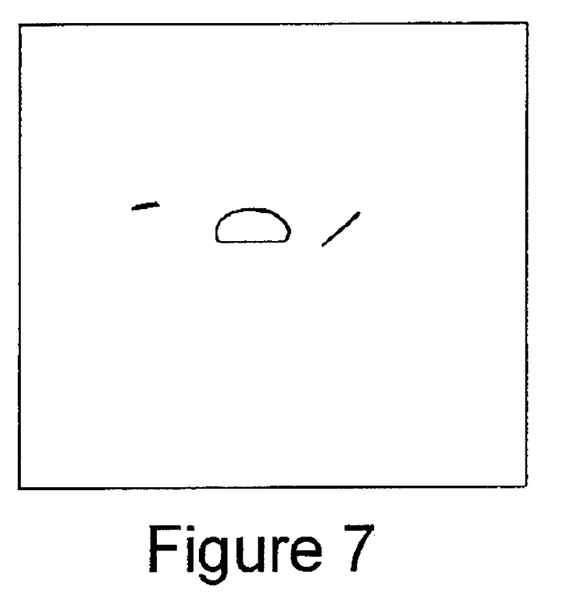
FIG. 7 is a graphical depiction of an "extras" array of the type generated comparison of the template of FIG. 3B and image of FIG. 4C by systems and methods according to the invention.

A further understanding of the match, missing and extras arrays may be attained by reference to FIGS. 5–7. FIG. 5A graphically illustrates the match array. The lines of that figure represent the boundary points from FIG. 3B that match boundary points from FIG. 4C. FIG. 5B is a table indicating the quantitative and/or qualitative measures recorded to the match array in step 50. FIG. 6 graphically illustrates the missing array and FIG. 7 graphically illustrates the extras array.

Referring back to step 50, a preferred embodiment of the invention records with each pair of matched points the identities of the features with which those points are associated in the pattern and image, respectively. This is illustrated in FIG. 5B, showing that the depicted points are associated with Feature #1 in the pattern and Feature #12 in the image. Steps 52 and 56 can similarly record the identities of the features associated with the points recorded in the extras and missing arrays, respectively. As discussed above, information regarding the features with which boundary points from the runtime image (and pattern) are associated is preferably obtained by connectivity analysis. See step 39.

Figure 2B:
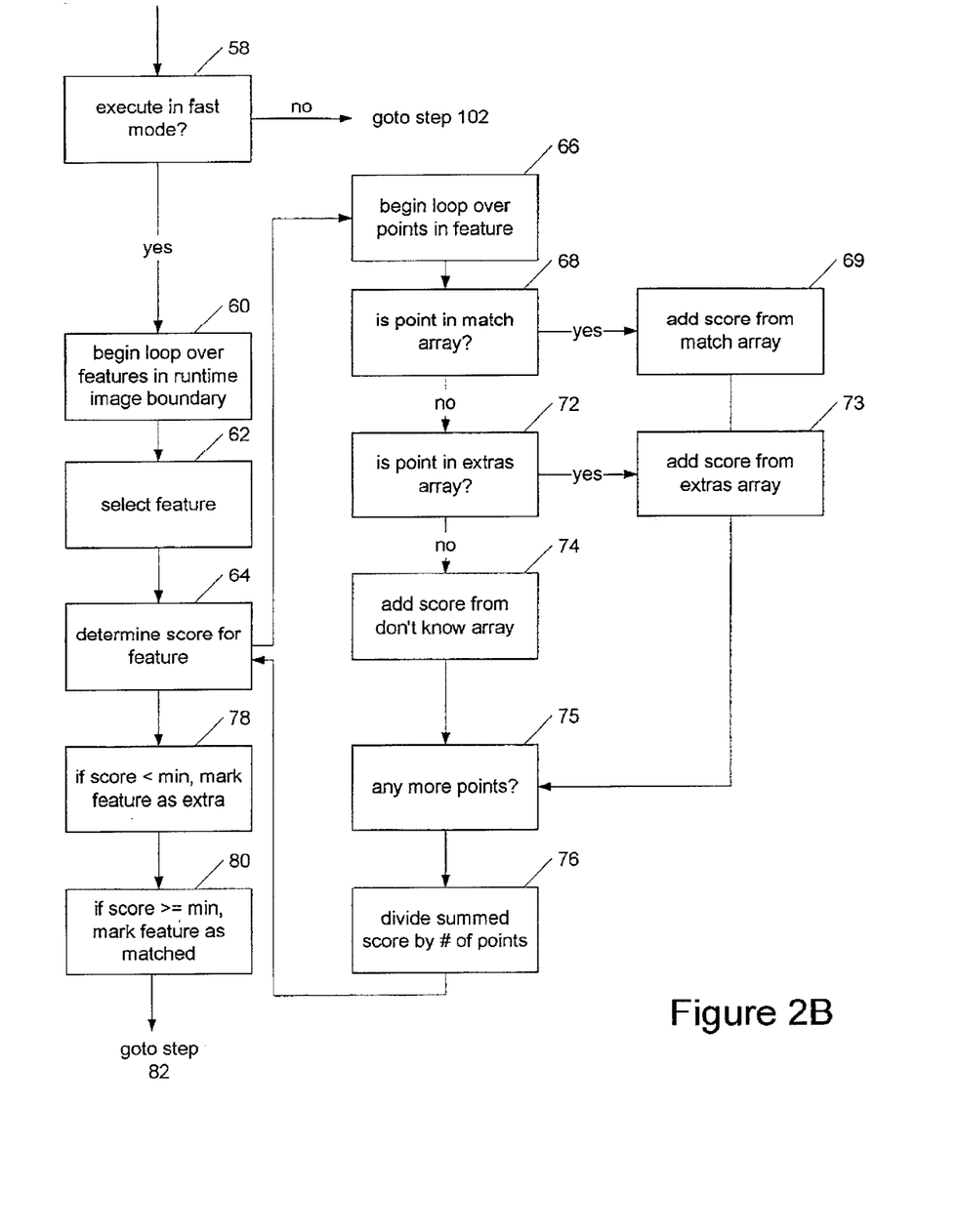
Figure 2C:
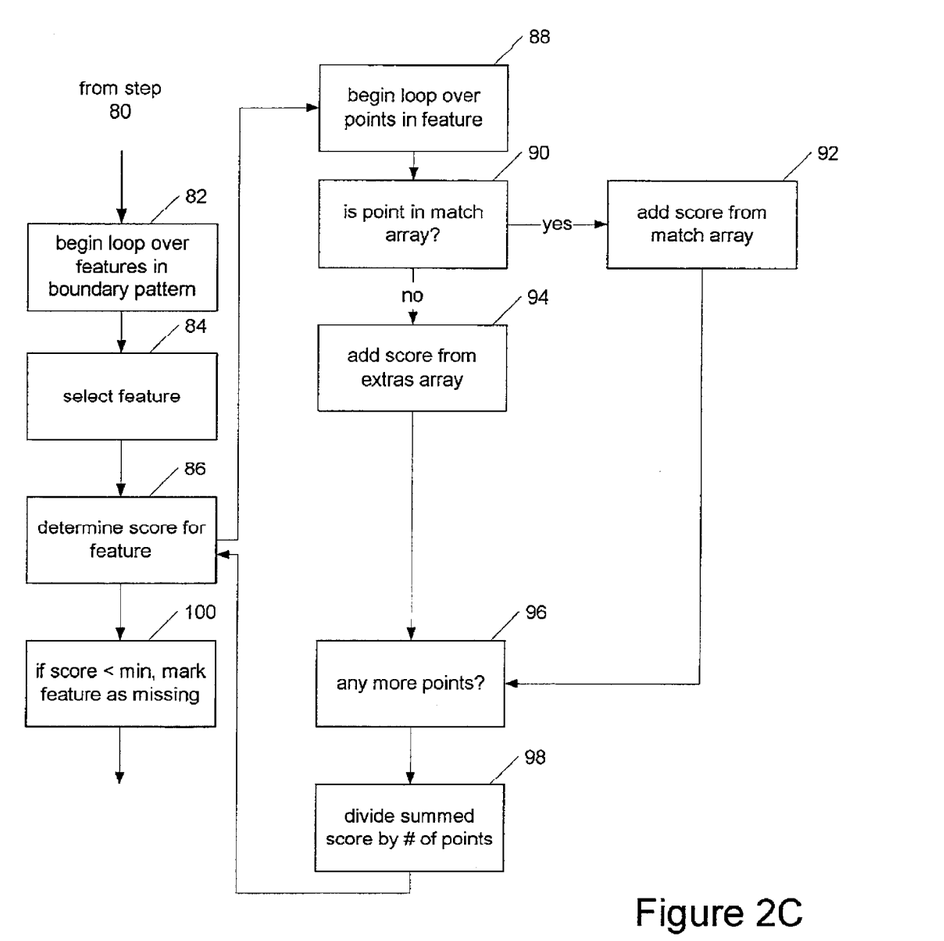
Figure 2D:
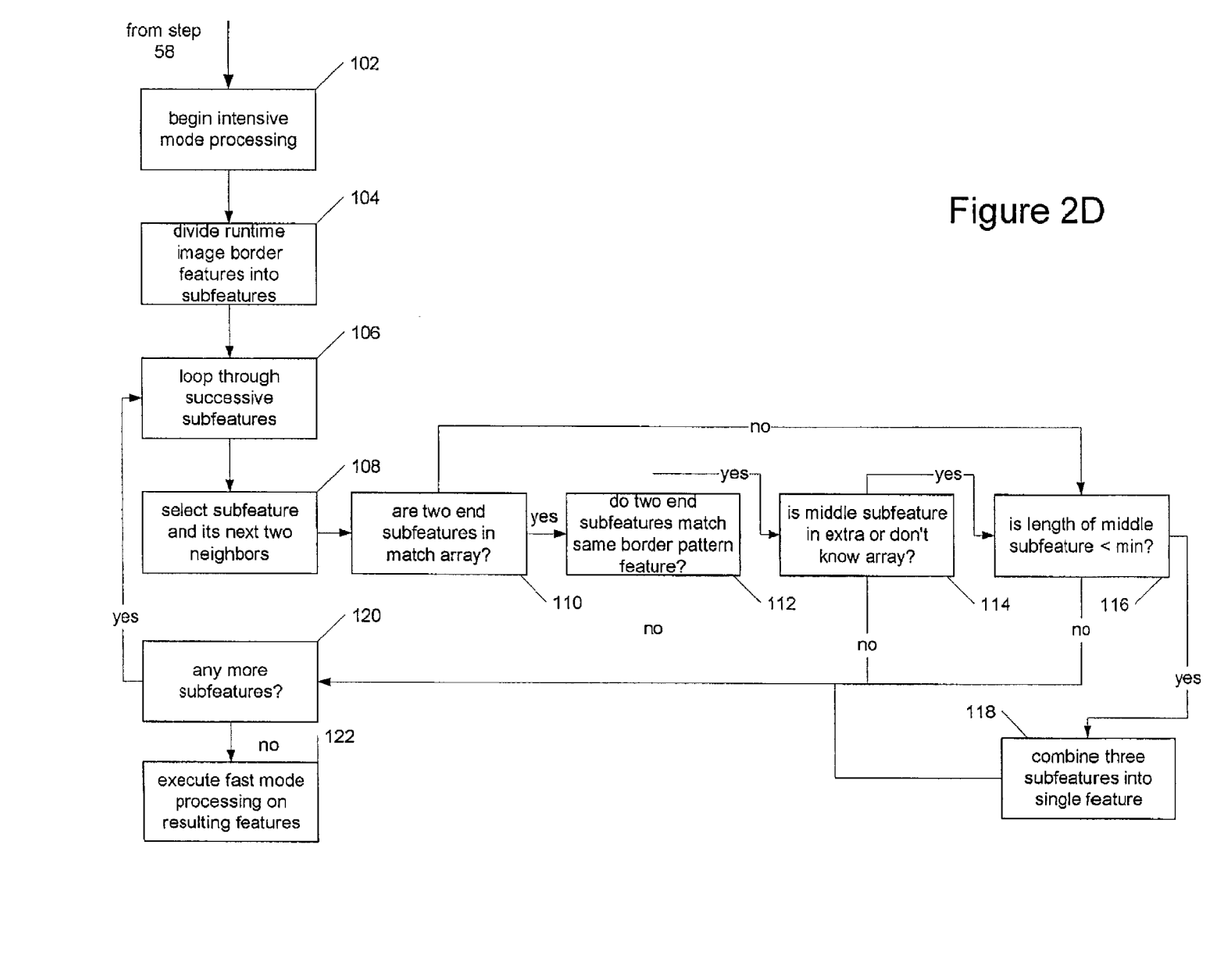

FIGS. 2B–2D illustrate how this information is used to conduct feature-by-feature comparison of the pattern and the image, with FIG. 2B illustrating the "fast mode" processing of runtime image boundary features based on information in the matching and extra arrays, FIG. 2C illustrating the fast mode processing of boundary pattern features based on information in the matching and missing arrays, and FIG. 2D illustrating the "intensive mode" consolidation of subfeatures.

Referring to step 58, the method determines whether comparison is to be done in fast or intensive modes. This can be based on operator selection, on defaults, on system configurations, or on any other such information typically used for this purpose in the art.

If fast mode is selected, step 60 begins a loop over features in the runtime boundary image. A listing of those features can be gleaned from the match, extras and don't know arrays though, preferably, it is maintained in a separate array associated with the boundary image. In step 62, the method selects a feature.

In step 64, the method determines a score for the selected feature. In preferred embodiments that score is statistically determined and, more particularly, it is determined as a mean of the scores for the points that make up the selected feature. As discussed above, those scores are preferably stored in the match, extra and don't know arrays. This determination is detailed in steps 66–76, wherein the method loops through each point that make up the feature, summing the scores maintained for respective points in the aforementioned arrays and dividing the total by the number of points.

In steps 78–80, the method compares the score (as determined in steps 64–76) with a preselected minimum. If the score is less then the minimum, the feature is marked as "extra". Otherwise, the feature is marked as "matching". Indications of these determinations can be stored to the aforesaid separate array associated with the boundary image. Preferably, however, they are maintained in separate arrays referred to herein as the matching feature and extra feature arrays.

In another preferred embodiment, the methodology shown in FIG. 2B uses thresholds of the type described above to assigning features to matching, extra and don't know feature arrays.

Referring to FIG. 2C, steps 82–100 process boundary pattern features based on scores in the matching and missing arrays. The method proceeds, generally, as indicated above and, specifically, as shown in FIG. 2C. Of note, in step 92 the method preferably assigns to each boundary pattern point in the match array the highest of the scores assigned to that point. In this regard, it will be appreciated that any given boundary pattern point may match multiple runtime image boundary points (though, any given runtime image boundary point may only match one boundary pattern point). Of further note, in step 100, the method denotes a feature as missing only if the average of the scores for its component points is below a minimum.

FIG. 2D illustrates intensive mode for consolidation of certain subfeatures into features, beginning with step 102. In step 104, the method splits each feature in the runtime image border into contiguous subfeatures, each of which includes exclusively (i) only border points that are designated as extra, or (ii) only border points that match a common feature from the border pattern, or (iii) only border points that have been assigned to the don't know array.

Step 106 begins a loop over the successive overlapping groupings of three adjacent subfeatures. In steps 108–116 the method examines each grouping to see whether (i) the subfeatures at the ends both match a common feature from the border pattern (i.e., the points that make up those subfeatures match such a common feature) or, alternatively, are both extra (i.e., the points that make up those subfeatures are designated as extra), and (ii) the subfeature in the middle is shorter than a minimum length that is defined, e.g., by the operator, by default or otherwise. If so, the three subfeatures are consolidated into a single feature that is marked as matching or extra in accord with the characteristics of the ends of the subgroup. The feature arrays containing the points that make up the subgroup are updated accordingly. See step 118.

Once all of the subfeatures have been so analyzed and processed, the method proceeds from step 120 to step 122, where the newly consolidated features are processed in accord with the fast mode technique discussed above and shown in FIGS. 2B and 2C.

Following point-by-point and/or feature-by-feature comparison of the pattern and image, as described above, the illustrated method generates one or more outputs representative of those comparisons or otherwise based thereon.

Thus, for example, the method can generate images representative of the matching, missing or extra points, as represented in the match, missing or extra arrays, respectively. Images of the matching points can be used, for example, to aid the operator in visually determining whether there is a sufficient degree of match between the pattern and image. Those images can also be used by other machine vision applications, e.g., for purposes of determining the location and orientation in the image of an object matching the pattern.

According to other embodiments of the invention, the match array can be quantitatively or qualitatively analyzed to provide still better and/or different indications of the degree of match between the pattern and the image. By way of non-limiting example, the illustrated method can count the number of points in the match array and output the results to the operator or to another machine vision application. Moreover, depending on thresholds (which may be supplied by the operator, by default, or otherwise), the method can output a qualitative indication that the match between the pattern and image is "good," e.g., if the aforementioned count is above a high threshold, or "bad," if that count is below a low threshold.

In still another embodiment of the invention, the method generates a histogram or other such statistical analyses of distance, angle or contrast differences stored in the match array. Such a histogram provides, for example, a quantitative determination of the "smoothness" of the match between the pattern and the runtime image.

As noted above, the method can generate images from the missing and matching arrays, as well. These can be useful in helping the operator to visually identify differences between the pattern and the image. Depending upon the application in which the invention is employed, for example, those differences may represent defects in the objects shown in the image.

Further embodiments of the invention provide for quantitative and/or qualitative analysis of the missing and extra arrays to provide still better and/or different indications of the degree of match between the pattern and the image. By way of non-limiting example, the illustrated method can count the number of points in each these arrays, measure the colinearity of those points, or statistically analyze their locations. Moreover, the method can compare boundaries defined by points in the missing or extra arrays against still further templates, e.g., to facilitate identifying the nature of the perturbations represented thereby. Results of these analyses can be output to the operator directly or in qualified form, e.g., following their application against thresholds or other benchmarks.

The foregoing quantitative and qualitative analyses can be further refined based on the information embodied in the matching feature array, extra feature array, don't know feature array and/or missing feature array. Particularly, for example, any of the foregoing graphical, quantitative or qualitative outputs can be grouped by feature to facilitate analysis thereof by the operator or by another machine vision application.

Described herein are methods and apparatus meeting the objects set forth above. Those skilled in the art will appreciate that the illustrated embodiments are merely examples of the invention and that other embodiment, incorporating, changes therein fall within the scope of the invention. Thus, for example, it will be appreciated that image analysis techniques other than connectivity analysis may be utilized to identifying points defining features in the images; that quantitative and qualitative measures other than those discussed above may be used in evaluating the match, missing or extras arrays; that data structures other than arrays (e.g., images) may be used to store the information identified above as being contained in those arrays; that the match and extra arrays may be generated relative to the boundary pattern (and the missing array may be generated relative to the runtime image boundary), not vice versa as discussed above; that rather than storing matches, misses, extras and don't know's in separate arrays, all information regarding points in the boundary pattern and/or the runtime image boundary can be stored in a single array.

In view of the foregoing, what we claim is:

1. In a machine vision method for comparing a pattern and an image, the improvement comprising:

A. finding points on a boundary in the image,

B. identifying a boundary feature in the image, the boundary feature being defined by a plurality of the points on the boundary in the image, C. determining one or more point-to-point relationships, if any, between each point defining the boundary feature and a corresponding point, if any, on a boundary in the pattern, and C1. step (c) including assigning a numerical score that is a function of differences in any of location, angle or contrast of the point on the boundary feature in the image and the corresponding point, if any, on the boundary in the boundary in the pattern, D. determining a relationship between the boundary feature in the image and the pattern as a function of the relationship determined in step (C), D1. step (D) includes determining whether the boundary feature in the image is extra with respect to the pattern as a function of whether the numerical score determined in step (C1) falls below either a first threshold or a second threshold.

2. In a machine vision method according to claim 1, the further improvement wherein step (C) includes identifying as corresponding a point on the pattern that is within a designated distance of a point in the image.

3. In a machine vision method according to claim 2, the further improvement wherein step (D) includes determining whether the boundary feature in the image matches the pattern by counting a number of the points on the boundary feature in the image that match points on a boundary in the pattern.

4. In a machine vision method according to claim 1, the further improvement wherein step (C) includes determining whether each of the points on the boundary feature in the image either (i) matches a corresponding point on a boundary in the pattern, or (ii) is extra with respect to points on a boundary in the pattern.

5. In a machine vision method according to claim 4, the further improvement wherein step (D) includes determining whether the boundary feature in the image either matches or is extra with respect to the pattern based a count of a number of the points on the boundary feature in the image that either match or extra with respect to points on a boundary in the pattern.

6. In a machine vision method according to claim 1, the further improvement comprising the steps of:

E. identifying a boundary feature in the pattern, the boundary feature being defined by a plurality of the points in the pattern;

F. determining one or more point-to-point relationships, if any, between each point defining the boundary in the pattern and a corresponding point on the boundary in the image, and G. determining a relationship between the boundary feature in the pattern and the boundary in the image as a function of the relationships determined in step (F).

7. In a machine vision method according to claim 6, the further improvement wherein step (F) includes determining whether a point on the boundary feature in the pattern is missing from the boundary in the image.

8. In a machine vision method according to claim 7, the further improvement wherein step (G) includes determining whether the boundary feature in the pattern is missing from the image based on a count of a number of the points on the boundary feature in the pattern that are missing from the boundary in the image.

9. In a machine vision method for comparing a pattern and an image, the improvement comprising:

A. finding points on a boundary in the image,

B. identifying a boundary feature in the image, the boundary feature being defined by a plurality of the points on the boundary in the image, C. determining a quantitative point-to-point relationships, if any, between each point defining the boundary feature and a corresponding point, if any, on a boundary in the pattern, and C1. step (C) includes assigning a numerical score that is a function of differences in any of the location, angle or contrast of the point on the boundary feature in the image and the corresponding point, if any, on the boundary in the boundary in the pattern, D. determining a relationship between the boundary feature in the image and the patterns a function of the quantitative relationships determined in step (C), D1. step (D) includes determining whether the boundary feature in the image is extra with respect to the pattern as a function of whether the score determined in step (C1) falls below either a first threshold or a second threshold.

10. In a machine vision method according to claim 9, the further improvement wherein step (C) comprises assigning a numerical score to each point on the boundary feature in the image as a function of a difference in any of a location, angle and contrast of that point and a corresponding point if any, on the boundary in the pattern.

11. In a machine vision method according to claim 10, the further improvement wherein step (D) comprises determining a relationship between the boundary feature in the image and the pattern as a statistical function of the numerical scores determined in step (C).

12. In a machine vision method according to claim 11, the further improvement wherein step (D) includes determining whether the boundary feature in the image matches the pattern based on whether the statistical function of the numerical scores determined in step (C) exceeds a first threshold.

13. In a machine vision method according to claim 9, further improvement comprising the steps of:

E. identifying a boundary feature in the pattern, the boundary feature being defined by a plurality of the points on the boundary in the pattern, F. determining a quantitative point-to-point relationship between each point defining the boundary feature in the pattern and a corresponding point, if any, on a boundary in the image, and G. determining a relationship between the boundary feature in the pattern and the image as a function of the quantitative relationships determined in step (F).

14. In a machine vision method according to claim 13, further improvement wherein step (F) comprises assigning a numerical score to each point on the boundary feature in the pattern based on a difference in any of a location, angle and contrast of that point and a corresponding point, if any, on the boundary in the image.

15. In a machine vision method according to claim 14, the further improvement wherein step (G) includes determining whether the boundary feature in the image is missing with respect to to the pattern as a function of whether a statistical measure of the numerical score determined in step (F) falls below a threshold.

16. In a machine vision method for comparing a pattern and an image, the improvement comprising:

A. finding points on a boundary in the image,

B. identifying a boundary feature in the image, the boundary feature being defined by a plurality of the points on the boundary in the image, C. determining one or more point-to-point relationships, if any, between each point defining the boundary feature and a corresponding point, if any, on a boundary in the pattern, and C1. step (c) including assigning a numerical score that is a function of differences in any of location, angle or contrast of the point on the boundary feature in the image and the corresponding point, if any, on the boundary in the boundary in the pattern, D. determining a relationship between the boundary feature in the image and the pattern as a function of the relationship determined in step (C), D1. step (D) includes determining whether the boundary feature in the image is extra with respect to the pattern as a function of whether the score determined in step (C1) falls below either a first threshold or a second threshold.

17. In a machine vision system according to claim 16, the further improvement wherein step (C) includes identifying as corresponding a within a designated distance of a point in the image.

18. In a machine vision system according to claim 17, the further improvement wherein step (D) includes determining whether the boundary feature in the image matches the pattern as a function of a number of the points on the boundary feature in the image that match points on a boundary in the pattern.

19. In a machine vision system according to claim 16, the further improvement wherein step (C) includes determining whether each of the points on the boundary feature in the image any of (i) matches a corresponding point on a boundary in the pattern and (ii) is extra with respect to points on a boundary in the pattern.

20. In a machine vision system according to claim 19, the further improvement wherein step (D) includes determining whether the boundary feature in the image any of matches and is extra with respect to the pattern as a function of a number of the points on the boundary feature in the image that any of match and are extra with respect to points on a boundary in the pattern.

21. In a machine vision system according to claim 16, the further improvement comprising the steps of:

E. identifying a boundary feature in the pattern, the boundary feature being defined by a plurality of the points in the pattern;

F. determining one or more point-to-point relationships, if any, between each point defining the boundary in the pattern and a corresponding point, if any, on the boundary feature in the image, and G. determining a relationship between the boundary feature in the pattern and the boundary in the image as a function of the relationships determined in step (F).

22. In a machine vision system according to claim 21, the further improvement wherein step (F) includes determining whether the points on the boundary feature in the pattern are missing from the boundary in the image.

23. In a machine vision system according to claim 22, the further improvement wherein step (G) includes determining whether the boundary feature in the pattern is missing from the image as a function of a number of the points on the boundary feature in the pattern that are missing from the boundary in the image.

24. In a machine vision method for comparing a pattern and an image, the improvement comprising:
   A. finding points on a boundary in the image,
   B. identifying a boundary feature in the image, the boundary feature being defined by a plurality of the points on the boundary in the image,
   C. determining a quantitative point-to-point relationships, if any, between each point defining the boundary feature and a corresponding point, if any, on a boundary in the pattern, and
      C1. step (C) includes assigning a numerical score that is a function of differences in any of the location, angle or contrast of the point on the boundary feature in the image and the corresponding point, if any, on the boundary in the boundary in the pattern,
   D. determining a relationship between the boundary feature in the image and the patterns a function of the quantitative relationships determined in step (C),
      D1. step (D) includes determining whether the boundary feature in the image is extra with respect to the pattern as a function of whether the score determined in step (C1) falls below either a first threshold or a second threshold.

25. In a machine vision system according to claim 24, the further improvement wherein step (C) comprises assigning a numerical score to each point on the boundary feature in the image as a function of a difference in any of a location, angle and contrast of that point and a corresponding point, if any, on the boundary in the pattern.

26. In a machine vision system according to claim 25, the further improvement wherein step (C) comprises assigning the numerical score as a fuzzy logic function of differences in the location, angle and contrast of the point on the boundary feature in the image and the corresponding point, if any, on the boundary in the boundary in the pattern.

27. In a machine vision system according to claim 25, the further improvement wherein step (D) comprises determining a relationship between the boundary feature in the image and the pattern as a statistical function of the quantitative relationships determined in step (C).

28. In a machine vision system according to claim 27, the further improvement wherein step (D) includes determining whether the boundary feature in the image matches the pattern as a function of whether a statistical measure of the quantitative relationships determined in step (C) exceeds a first threshold.

29. In a machine vision system according to claim 27, the further improvement wherein step (D) includes determining whether the boundary feature in the image is extra with respect to to the pattern as a function of whether a statistical measure of the quantitative relationships determined in step (C) falls below any of a first threshold and a second threshold.

30. In a machine vision system according to claim 24, the further improvement comprising the steps of:
   E. identifying a boundary feature in the pattern, the boundary feature being defined by a plurality of the points on the boundary in pattern,
   F. determining a quantitative point-to-point relationship between each point defining the boundary feature in the pattern and points on a boundary in the image, and
   G. determining a relationship between the boundary feature in the pattern and the image as a function of the quantitative relationships determined in step (F).

31. In a machine vision system according to claim 30, the further improvement wherein step (F) comprises assigning a numerical score to each point on the boundary feature in the pattern as a function of a difference in any of a location, angle and contrast of that point and a corresponding point, if any, on the boundary in the image.

32. In a machine vision system according to claim 31, the further improvement wherein step (G) includes determining whether the boundary feature in the image is missing with respect to to the pattern as a function of whether a statistical measure of the quantitative relationships determined in step (F) falls below a threshold.

* * * * *